(12) United States Patent
Lewis et al.

(10) Patent No.: US 6,639,008 B2
(45) Date of Patent: *Oct. 28, 2003

(54) CURABLE SILICONE COMPOSITIONS, METHODS AND ARTICLES MADE THEREFROM

(75) Inventors: Larry Neil Lewis, Scotia, NY (US); Steven Kennth Gifford, Buskirk, NY (US); Slawomir Rubinsztajn, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,072

(22) Filed: Nov. 27, 2001

(65) Prior Publication Data

US 2003/0100669 A1 May 29, 2003

(51) Int. Cl.$^7$ ............................. C08L 83/00; C08K 3/08; C08K 3/20
(52) U.S. Cl. ................. 524/588; 524/404; 524/428; 524/430; 524/431; 524/432; 524/439; 524/440; 528/25; 528/26; 528/27; 528/32; 528/38
(58) Field of Search .................. 528/25, 26, 27, 528/32, 38; 524/439, 440, 430, 431, 432, 404, 428, 588; 252/71, 74, 78.3

(56) References Cited

U.S. PATENT DOCUMENTS

| | | | |
|---|---|---|---|
| 4,068,032 A | | 1/1978 | Alonso |
| 5,021,494 A | | 6/1991 | Toya |
| 5,650,453 A | * | 7/1997 | Eckberg et al. ............... 522/31 |
| 5,928,569 A | | 7/1999 | Reo |
| 5,928,570 A | | 7/1999 | Reo |
| 6,020,424 A | * | 2/2000 | Osuna et al. ............... 524/847 |
| 6,040,362 A | * | 3/2000 | Mine et al. .................. 523/212 |
| 6,069,201 A | * | 5/2000 | Okinoshima et al. ....... 524/783 |
| 6,074,963 A | * | 6/2000 | Okami et al. ................. 442/16 |
| 6,124,780 A | | 9/2000 | Duggal et al. |
| 6,128,168 A | | 10/2000 | Arnold et al. |
| 6,290,879 B1 | | 9/2001 | Duggal et al. |
| 6,448,329 B1 | * | 9/2002 | Hirschi et al. ............... 524/588 |

OTHER PUBLICATIONS

Abstract—"Electric Properties of Metal–Filled Polymers From Silicone Rubbers and Finely Divided Silver", Y.I. Khimchenko, L.S. Radkevich, V.A. Kompaniets, USSR. Fiz.–Khim. Mekh. Liofil'nost Dispersn. Sist. (1973), No. 5 75–9. From: Ref. Zh., Khim. 1973, Abstr. No. 17S87.

Abstract—"Highly Heat–Conductive Hot–Press Polyimide–Siloxane Adhesive Films", J. Sakamoto, T. Takeda, N. Takeda, T.K. Kokai (1993) 6 pp.

"Parameters Affecting Silver Flake and Powder Performance In Silver Filled Polymers", B.L. Roos–Kozel & F.M. Casavecchia, 1984 IEEE, pps. 167–171.

"Silver Filled Polyimidesiloxane Die Attach Material", M.N. Nguyen & J.H. Wood, 4th International SAMPE Electronics Conference, Jun. 12–14, 1990, pps. 291–301.

"High–Performance Electrically Conductive Silicone Adhesives", M.A. Lutz, R.L. Cole, Dow Corning Corp., Midland, Michigan–Hybrid Circuits, No. 23, Sep. 1990, pps. 27–30.

"Flexible Silicone Adhesive With High Electrical Conductivity", Michael A. Lutz & Richard L. Cole–Dow Corning Corp., Midland, MI, pps. 83–87.

"Aluminum Nitride and Diamond Particle Filled Polyimidesiloxane As Dielectrics With Low Thermal Expansion and Increased Thermal Conductivity", L. Li & D.D.L. Chung, 4th International SAMPE Electronics Conf., Jun. 12–14, 1990, pps. 236–240.

U.S. Patent application S.N. 09/892,529, filed Jun. 25, 2001 entitled "Curable Silicone Compositions, Methods and Articles Made Thereby", Larry N. Lewis, pps. 1–23 (RD–29265).

"Hackh's Chemical Dictionary, $4^{th}$ edition", 1969 McGraw Hill Book Co., p. 215.*

* cited by examiner

*Primary Examiner*—Robert Dawson
*Assistant Examiner*—Marc S Zimmer
(74) *Attorney, Agent, or Firm*—Bernadette M. Bennett; Patrick K. Patnode

(57) ABSTRACT

A silicone composition that includes at least one functionalized polydiorganosiloxane, at least one cure catalyst, at least one reactive diluent, and at least one thermally conductive filler is provided in the present invention. Further embodiments of the present invention include a method for substantially increasing the thermal conductivity of a silicone composition and a thermal interface material containing the aforementioned silicone composition.

58 Claims, No Drawings

CURABLE SILICONE COMPOSITIONS, METHODS AND ARTICLES MADE THEREFROM

BACKGROUND OF THE INVENTION

The present invention is related to silicone compositions. More particularly, the present invention is related to low viscosity, curable polydiorganosiloxane compositions.

Dispensable materials that can cure and give high thermal conductivity are typically used in the electronics industry. Currently, there are two classes of cured articles used as thermally conductive sinks. Sakamoto et al., Japanese Patent No. 05117598, discuss highly filled matrices that are cured to make a pad. The pad can be cut and physically placed in an electronic device. Toya, Japanese Patent No. 02097559, discusses a filled matrix that is dispensed and cured in place. The dispensable approach requires that the material have a viscosity that is low enough such that the material can be forced through an orifice for rapid manufacture of many parts. However, the final cured product must have a sufficiently high thermal conductivity.

There remains a need to find a material that has a sufficiently low viscosity such that it can be rapidly placed on a small device with high power requirements. The high power requirement needs a way to remove more heat. This requirement necessitates a thermally conductive material. Thus, dispensable, curable, and high thermally conductive materials are constantly being sought.

BRIEF SUMMARY OF THE INVENTION

The present invention provides a silicone composition comprising a curable adhesive formulation which comprises (A) a functionalized polydiorganosiloxane having the general formula:

$$(R^1)_{3-p}R^2_p SiO[(R^1)_2SiO]_m[R^1R^2SiO]_n Si(R^1)_{3-q}R^2_q$$

wherein $R^2$ is independently at each occurrence vinylcyclohexeneoxy, silane, epoxy, glycidoxy, acryloxy, imide, urethane, vinyl, or combinations thereof; $R^1$ is independently at each occurrence a $C_{1-8}$ alkyl radical, phenyl radical, vinyl radical, or combination thereof; "p" is 0 or 1; "q" is 0 or 1; "m"+"n" has a value sufficient to provide a polydiorganosiloxane with an initial viscosity in a range between about 100 centipoise and about 50,000 centipoise at 25° C.;

(B) at least one reactive diluent;

(C) at least one cure catalyst; and (D) at least one thermally conductive filler;

wherein the total silicone composition has a viscosity in a range between about 10,000 centipoise and about 250,000 centipoise at 25° C. before cure.

The present invention further provides a method for increasing the thermal conductivity of a silicone composition comprising:

(A) providing at least one functionalized polydiorganosiloxane having the general formula:

$$(R^1)_{3-p}R^2_p SiO[(R^1)_2SiO]_m[R^1R^2SiO]_n Si(R^1)_{3-q}R^2_q$$

wherein $R^2$ is independently at each occurrence vinylcyclohexeneoxy, silane, epoxy, glycidoxy, acryloxy, imide, urethane, vinyl, or combinations thereof; $R^1$ is independently at each occurrence a $C_{1-8}$ alkyl radical, phenyl radical, vinyl radical, or combination thereof; "p" is 0 or 1; "q" is 0 or 1; "m"+"n" has a value sufficient to provide a polydiorganosiloxane with an initial viscosity in a range between about 100 centipoise and about 50,000 centipoise at 25° C.;

combining into the polydiorganosiloxane at least one thermally conductive filler in a range between about 60% by weight and about 95% by weight of the total silicone composition;

combining into the polydiorganosiloxane at least one diluant; and combining into the polydiorganosiloxane at least one cure catalyst wherein the total silicone composition has a viscosity in a range between about 10,000 centipoise and about 250,000 centipoise at 25° C. before cure.

In yet a further embodiment of the present invention, there is provided a thermal interface material comprising:

(A) at least one polydiorganosiloxane having the general formula:

$$(R^1)_{3-p}R^2_p SiO[(R^1)_2SiO]_m[R^1R^2SiO]_n Si(R^1)_{3-q}R^2_q$$

wherein $R^2$ is independently at each occurrence vinylcyclohexeneoxy, silane, epoxy, glycidoxy, acryloxy, imide, urethane, vinyl, or combinations thereof; $R^1$ is independently at each occurrence a $C_{1-8}$ alkyl radical, phenyl radical, vinyl radical, or combination thereof; "p" is 0 or 1; "q" is 0 or 1; "m"+"n" has a value sufficient to provide a polydiorganosiloxane with an initial viscosity in a range between about 100 centipoise and about 50,000 centipoise at 25° C.;

(B) at least one reactive diluent;

(C) at least one cure catalyst; and (D) at least one thermally conductive filler;

wherein the thermal interface material provides adhesion to at least one substrate.

DETAILED DESCRIPTION OF THE INVENTION

It has been found that the use of at least one functionalized polydiorganosiloxane, at least one reactive diluent, at least one cure catalyst, and at least one thermally conductive filler provides a formulation with a low viscosity of the total silicone composition before cure and whose cured parts have a high thermal conductivity. "High thermal conductivity" as used herein refers to a cured total silicone composition with a thermal conductivity greater than about 1.5 Watts per meter per degree Kelvin (W/mK). "Low viscosity of the total silicone composition before cure" typically refers to a viscosity of the composition in a range between about 10,000 centipoise and about 250,000 centipoise and preferably, in a range between about 20,000 centipoise and about 100,000 centipoise at 25° C. before the silicone composition is cured. "Cured" as used herein refers to a total silicone composition with reactive groups wherein in a range between about 50% and about 100% of the reactive groups have reacted.

The functionalized polydiorganosiloxane has the general formula (I), $$(R^1)_{3-p}R^2_p SiO[(R^1)_2SiO]_m[R^1R^2SiO]_n Si(R^1)_{3-q}R^2_q \quad (I)$$

wherein $R^2$ is independently at each occurrence vinylcyclohexeneoxy, silane, epoxy, glycidoxy, acryloxy, imide, urethane, vinyl, or combination thereof; $R^1$ is independently at each occurrence a $C_{1-8}$ alkyl radical, phenyl radical, vinyl radical, or combination thereof; "p" is 0 or 1; "q" is 0 or 1; "m"+"n" has a value sufficient to provide a polydiorganosiloxane with an initial viscosity in a range between about 100 centipoise and about 50,000 centipoise at 25° C. and a functional content in a range between about 1% by weight and about 10% by weight of the functionalized polydiorganosiloxane. Radicals represented by $R^1$ are preferably $C_{1-4}$ alkyl radicals and more preferably, methyl. Typically, the functionalized polydiorganosiloxane is present in a range between about 0.5% by weight and about 5% by weight of the total silicone composition, and more typically in a range between about 1% by weight and about 2% by weight of the total silicone composition.

Additionally, a reactive organic diluant may be added to the silicone composition to decrease the viscosity of the composition. Examples of diluants include, but are not limited to, styrene monomers such as tert-butyl styrene (t-Bu-styrene), (meth)acrylate monomers such as methylmethacrylate and hexanedioldiacrylate, methacryloxy-containing monomers such as methacryloxypropyltrimethoxysilane, epoxy-containing monomers such as biscyclohexaneoxyethylenetetramethylsiloxane, glycidoxy-containing monomers such as glycidoxypropyltrimethoxysilane, hydride-stopped polydimethylsiloxanes, and vinyl ethers. It is to be understood that (meth)acrylate includes both acrylates and methacrylates. Vinyl ethers include mono-, di-, and poly-vinyl ethers containing carbon atoms in a range between about 2 and about 20. The preferred reactive diluants are methacryloxypropyltrimethoxysilane and vinyl ethers. The mixture of the diluant and the functionalized polydiorganosiloxane lowers the viscosity, which allows for higher loading of thermally conductive filler. The amount of thermally conductive filler in the silicone composition is directly proportional to the thermal conductivity. Thus, the higher the amount of thermally conductive filler in the silicone composition, the greater the thermal conductivity of the silicone composition.

The thermally conductive fillers in the present invention include all common thermally conductive solids. Thermally conductive fillers in the present invention include, for example, forms of silver, gold, copper, nickel, platinum group metals, and combinations thereof. Silver is the preferred thermally conductive filler. Examples of thermally conductive silver include, but are not limited to, silver powders, silver flakes, colloidal silver, and combinations thereof. Further examples of thermally conductive fillers include, but are not limited to, aluminum oxide, aluminum nitride, boron nitride, diamond, magnesium oxide, zinc oxide, and zirconium oxide. The filler is present in a range between about 60% by weight and about 95% by weight of the total silicone composition, more typically the filler is present in a range between about 75% by weight and about 85% by weight of the total silicone composition.

Inhibitors such as esters of maleic acid (e.g. diallylmaleate, dimethylmaleate), acetylenic alcohols (e.g., 3,5 dimethyl-1-hexyn-3-ol and 2 methyl-3-butyn-2-ol), amines, and tetravinyltetramethylcyclotetrasiloxane and mixtures thereof can also be employed when used in an effective amount which is typically in a range between about 0.01% by weight and about 1% by weight of the total silicone composition.

Adhesion promoters can also be employed such as trialkoxyorganosilanes (e.g. γ-aminopropyltrimethoxysilane, glycidoxypropyltrimethoxysilane, bis(trimethoxysilylpropyl)fumarate) used in an effective amount which is typically in a range between about 0.01% by weight and about 1% by weight of the total silicone composition. The preferred adhesion promoter is bis(trimethoxysilylpropyl)fumarate.

Cure catalysts may also be present in the total silicone composition that accelerates curing of the total silicone composition. Typically, the catalyst is present in a range between about 10 parts per million (ppm) and about 10% by weight of the total silicone composition. Examples of cure catalysts include, but are not limited to, peroxide catalysts such as t-butylperoxybenzoate, onium catalysts such as bisaryliodonium salts (e.g. bis(dodecylphenyliodonium hexafluoroantimonate, (octyloxyphenyl, phenyl)iodonium hexafluoroantimonate, bisaryliodonium tetrakis (pentafluorophenyl)borate), triarylsulphonium salts, and platinum catalysts. Preferably, the catalyst is a bisaryliodonium salt. Curing typically occurs at a temperature in a range between about 50° C. and about 175° C., more typically in a range between about 100° C. and about 150° C., at a pressure in a range between about 1 atmosphere (atm) and about 5 tons pressure per square inch, more typically in a range between about 1 atmosphere and about 100 pounds per square inch (psi). In addition, curing may typically occur over a period in a range between about 5 minutes and about 1 hour, and more typically in a range between about 15 minutes and about 45 minutes.

The composition of the present invention may by hand mixed but also can be mixed by standard mixing equipment such as dough mixers, chain can mixers, planetary mixers, and the like.

The blending of the present invention can be performed in batch, continuous, or semi-continuous mode. With a batch mode reaction, for instance, all of the reactant components are combined and reacted until most of the reactants are consumed. In order to proceed, the reaction has to be stopped and additional reactant added. With continuous conditions, the reaction does not have to be stopped in order to add more reactants.

Thermally conductive materials as described in the present invention are dispensable and have utility in devices in electronics such as computers or in any device that generates heat and where the device requires the heat to be efficiently removed. The thermally conductive material is typically used as a thermal interface material that provides adhesion to at least one substrate such as silicon, gallium arsenide (GaAs), copper, nickel, and the like.

In order that those skilled in the art will be better able to practice the invention, the following examples are given by way of illustration and not by way of limitation.

EXAMPLE 1

A base siloxane was prepared by combining as follows: 20 grams (g) of GE Silicones vinyl-stopped polydimethylsiloxane with an average degree of polymerization of about 20, 5 g of GE Silicones blend of a 1000 centipoise (cps) vinyl-stopped polydimethylsiloxane and $MD^{Vi}Q$ resin, 1.7 g of GE Silicones $M^HQ$ crosslinker containing about 1 wt % hydrogen, 9.1 g of Gelest, Inc. intermediate DMSH03 which is H-stopped polydimethylsiloxane with an average degree of polymerization of 5.1 and 0.85 g of catalyst. The catalyst was pre-made and was composed of 87 milligrams (mg) of GE Silicones platinum catalyst, 4.3 g of GE Silicones adhesion promoter, 1.3 g of dibutylmaleate, 2.16 g of triallyl isocyanurate, and 2.16 g of glycidoxypropyltrimethoxysilane.

EXAMPLE 2

The base siloxane in example 1 (9 g) was combined with silver (38.4 g, 80/20 w/w silver powder/flake mixture of 80 parts Technic silver powder 17-253 and 20 parts Ames Goldsmith 1024 silver flake to give a final formulation of 81% by weight in silver). The silver-siloxane had a viscosity of 50,400 cps at 0.5 rotations per minute (rpm) as measured by a Brookfield Model DV-II Cone & Plate Viscometer using a #52 cone. The mixture was cured at 150° C. for 30 minutes and had a thermal conductivity of 5.17 W/mK (5.42 W/mK on repeat) as measured by a Holometrix TCA instrument.

EXAMPLE 3

The formulation prepared in Example 2 was repeated except that only silver flake was used (i.e. no powder was used). The initial viscosity was 80,000 cps. The thermal conductivity was measured for two samples. In one reading, a value of 16.5 W/mK was obtained and in the second reading, a value of 7.15 W/mK was obtained.

EXAMPLE 4

A base formulation was prepared composed of a 50/50 w/w mixture of Gelest Inc. intermediate DMSE21 (a glycidoxy-on-chain polydimethylsiloxane copolymer) and 1,4-divinyloxybutane. The 50/50 mixture above was then combined with 2% by weight of GE Silicones UV photo-initiator UV9380c. To the above polymer/catalyst mixture was added the silver powder/flake mixture of 80 parts Technic silver powder 17-253 and 20 parts Ames Goldsmith 1024 silver flake to give a final formulation 81% by weight in silver. The initial viscosity was 74,000 cps and the thermal conductivity of the cured formulation was 5.24 W/mK (a second sample was made and gave a thermal conductivity reading of 7.5 W/mK).

EXAMPLE 5

A base formulation was prepared composed of 50/50 w/w mixture of Gelest Inc. intermediate UMS182 (80–120 cps acryloxy-on-chain polydimethylsiloxane copolymer) and methacryloxypropyltrimethoxysilane. The 50/50 polymer mixture above was combined with 2% by weight of t-butylperoxybenzoate. An 80/20 silver powder/flake mixture of Example 4 was combined with the polymer catalyst mixture to make a formulation that was 81% by weight silver. The initial viscosity was 47,000 cps and the thermal conductivity of the cured formulation was 2.69 W/mK.

EXAMPLE 6

The polymer and silver formulation was prepared as in example 5 except that in place of the t-butylperoxybenzoate catalyst, UV 9380c as in example 4 was used. The formulation was made two times: once with a viscosity of 41,000 cps and once with a viscosity of 43,000 cps. The formulations were cured at 150° C. for 30 minutes in a Carver press at 5000 pounds per square inch. The thermal conductivity was greater than 6 W/mK (triplicate measurements) for both formulations.

While embodiments have been shown and described, various modifications and substitutions may be made thereto without departing from the spirit and the scope of the invention. Accordingly, it is to be understood that the present invention has been described by way of illustration and not limitation.

What is claimed is:

1. A silicone composition comprising a curable adhesive formulation which comprises
   (A) a functional polydiorganosiloxane having the general formula:

$$(R^1)_{3-p}(R^2)_p SiO[(R^1)_2 SiO]_m[R^1 R^2 SiO]_n Si(R^1)_{3-q} R^2_q$$

wherein $R^2$ is independently, at each occurrence, a vinylcyclohexeneoxy-functional group, a silane-functional group, an epoxy-functional group, a glycidoxy-functional group, an acryoxy-functional group, an imide-functional group, a urethane-functional group, vinyl or combinations thereof; $R^1$ is independently, at each occurance, a $C_{1-8}$ alkyl radical, a phenyl radical, a vinyl radical or combinations thereof "p" is 0 or 1; "q" is 0 or 1; "m"+"n" has a value sufficient to provide a polydiorganosiloxane with an initial viscosity in a range of between about 100 centipoise and about 50,000 centipoise at 25° C.;
   (B) at least one reactive diluent present in a concentration at least about equal to the concentration of component (A);
   (C) at least one cure catalyst; and
   (D) at least one thermally conductive filler present in a concentration in a range of between about 60% by weight and about 95% by weight, based on the total weight of the silicone composition;
   wherein the total silicone composition has a viscosity in a range of between about 10,000 centipoise and about 25,000 centipoise at 25° C. before cure and a thermal conductivity greater than about 1.5 W/mK after cure.

2. The silicone composition in accordance with claim 1, wherein $R^2$ is an acryloxy-functional group.

3. The silicone composition in accordance with claim 1, wherein $R^1$ is a methyl group.

4. The silicone composition in accordance with claim 1, wherein the thermally conductive filler comprises silver, gold, copper, platinum, nickel, aluminum oxide, aluminum nitride, boron nitride, diamond, magnesium oxide, zinc oxide, zirconium oxide, or combinations thereof.

5. The silicon composition in accordance with claim 4, wherein the thermally conductive filler comprises silver.

6. The silicon composition in accordance with claim 1, wherein the diluant comprises tert-butyl-styrene, methacryloxypropyltrimethoxysilane, methylmethacrylate, hexanedioldiacrylate, glycidoxypropyltrimethoxysilane, vinyl ether, or combinations thereof.

7. The silicon composition in accordance with claim 6, wherein the diluant comprises methacryloxypropyltrimethoxysilane.

8. The silicone composition in accordance with claim 6, wherein the diluant comprises vinyl ether.

9. A silicone composition in accordance with claim 1, wherein the cured composition provides adhesion to at least one substrate.

10. The silicone composition in accordance with claim 9, wherein the substrate comprises silicon.

11. The silicone composition in accordance with claim 1, wherein the curing catalyst comprises peroxide, onium salt, platinum catalyst, or combinations thereof.

12. The silicone composition accordance with claim 11, wherein the curing catalyst comprises bisaryliodonium salt.

13. The silicone composition in accordance with claim 1, wherein the catalyst is present in a range between about 10 parts per million and about 10% by weight of the total silicone composition.

14. The silicone composition in accordance with claim 1, which further comprises an adhesion promoter.

15. The silicone composition in accordance with claim 14, wherein the adhesion promoter comprises trialkoxyorganosilanes.

16. The silicone composition in accordance with claim 15, wherein the trialkoxyorganosilane is γ-aminopropyltrimethoxysilane, glycidoxypropyltrimethoxysilane, bis(trimethoxysilylpropyl)fumarate, or combinations thereof.

17. The silicone composition in accordance with claim 16, wherein the trialkoxyorganosilane is bis(trimethoxysilylpropyl)fumarate.

18. The silicone composition in accordance with claim 14, wherein the adhesion promoter is present in a range between about 0.01% by weight and about 1% by weight of the total silicone composition.

19. The silicone composition in accordance with claim 1, which is cured.

20. A silicone composition comprising a curable adhesive formulation which comprises (A) a polydiorganosiloxane having the general formula:

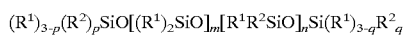

wherein $R^2$ is an acryloxy-functional group, $R^1$ is a methyl group, "p" is 0 or 1, "q" is 0 or 1, "m"+"n" has a value sufficient to provide a polydiorganosiloxane with an initial viscosity in a range of between about 100 centipoise and about 50,000 centipoise at 25° C.;

(B) at least one thermally conductive filler comprising silver present in a concentration in a range of between about 60% by weight and about 95% by weight, based on the total weight of the silicone composition;

(C) at least one reactive diluant comprising methacryloxypropyltrimethoxysilane;

(D) at least one curing catalyst comprising bisaryliodonium salt; and (E) optionally, at least one adhesion promoter comprising a bis(trimethoxysilylpropyl)fumarate;

wherein the total silicone composition has a viscosity in a range of between about 10,000 centipoise and about 250,000 centipoise at 25° C. before cure and a thermal conductivity greater than about 1.5 W/mK after cure.

21. A method for substantially increasing the thermal conductivity of a silicone composition comprising:

providing at least one functionalized polydiorganosiloxane wherein the polydiorganosiloxane has the general formula:

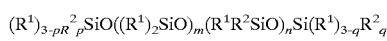

wherein $R^2$ is independently, at each occurrence, a vinylcyclohexeneoxy functional group, a silane-functional group, an epoxy-functional group, a glycidoxy-functional group, an acryloxy-functional group, a polyimide-functional group, a polyurethane-functional group, vinyl or combinations thereof; $R^1$ is independently, at each occurrence, a $C_{1-8}$ alkyl radical, a phenyl radical, a vinyl radical or combinations thereof; "p" is 0 or 1; "q" is 0 or 1; "m"+"n" has a value sufficient to provide a polydiorganosiloxane with an initial viscosity in a range of between about 100 centipoise and about 50,000 centipoise at 25° C.;

combining into the polydiorganosiloxane at least one thermally conductive filler in a range of between about 60% by weight and about 95% by weight of the total silicone composition;

combining into the polydiorganosiloxane at least one reactive diluant present in a concentration at least about equal to the concentration of the polydiorganosiloxane; and combining into the polydiorganosiloxane at least one cure catalyst wherein the total silicone composition has a viscosity in a range of between about 10,000 centipoise and about 25,000 centipoise at 25° C. before cure and a thermal conductivity greater than about 1.5 W/mK after cure.

22. The method in accordance with claim 21, wherein $R^2$ is an acryloxy-functional group.

23. The method in accordance with claim 21, wherein $R^1$ is a methyl group.

24. The method in accordance with claim 21, wherein the thermally conductive filler comprises silver, gold, copper, platinum, nickel, aluminum oxide, aluminum nitride, boron nitride, diamond, magnesium oxide, zinc oxide, zirconium oxide, or combinations thereof.

25. The method in accordance with claim 24, wherein the thermally conductive filler comprises silver.

26. The method in accordance with claim 21, wherein the reactive diluant comprises tert-butyl-styrene, methacryloxypropyltrimethoxysilane, methylmethacrylate, hexanedioldiacrylate, glucidoxypropyltrimethoxysilane, vinyl ether, or combinations thereof.

27. The method in accordance with claim 26, wherein the reactive diluant comprises methacryloxypropyltrimethoxysilane.

28. The method in accordance with claim 26, wherein the reactive diluant comprises vinyl ether.

29. The method in accordance with claim 21, wherein the cured composition provides adhesion to at least one substrate.

30. The method in accordance with claim 29, wherein the substrate comprises silicon.

31. The method in accordance with claim 21, wherein the curing catalyst comprises peroxide, onium salt, platinum catalyst, or combinations thereof.

32. The method in accordance with claim 31, wherein the curing catalyst comprises bisaryliodonium salt.

33. The method in accordance with claim 21, wherein the catalyst is present in a range between about 10 parts per million and about 10% by weight of the total silicone composition.

34. The method in accordance with claim 21, further comprising the step of combining into the polydiorganosiloxane at least one adhesion promoter.

35. The method in accordance with claim 34, wherein the adhesion promoter comprises trialkoxyorganosilanes.

36. The method in accordance with claim 35, wherein the trialkoxyorganosilane is γ-aminopropyltrimethoxysilane, glycidoxypropyltrimethoxysilane, bis(trimethoxysilylpropyl)fumarate, or combinations thereof.

37. The method in accordance with claim 36, wherein the trialkoxyorganosilane is bis(trimethoxysilylpropyl)fumarate.

38. The method in accordance with claim 34, wherein the adhesion promoter is present in a range of between about 0.01% by weight and about 1% by weight of the total silicone composition.

39. A method for increasing the thermal conductivity of a silicone composition comprising:

providing at least one polydiorganosiloxane having the general formula:

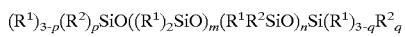

wherein $R^2$ is an acryloxy-functional group, $R^1$ is a methyl group, "p" is 0 or 1, "q" is 0 or 1, "m"+"n" has a value sufficient to provide a polydiorganosiloxane with an initial viscosity in a range of between about 100 centipoise and about 50,000 centipoise at 25° C.;

combining into the polydiorganosiloxane at least one thermally conductive filler in a range of between about 60% by weight and about 95% by weight of the total silicone composition wherein the filler comprises silver;

combining into the polydiorganosiloxane at least one diluant wherein the diluant comprises methacryloxypropyltrimethoxysilane;

combining into the polydiorganosiloxane at least one cure catalyst wherein the cure catalyst comprises a bisaryliodonium salt; and optionally combining into the polydiorganosiloxane at least one adhesion promoter comprising bis(trimethoxysilylpropyl)fumarate wherein the total silicone composition provides a viscosity in a range between about 10,000 centipoise and about 250,000 centipose at 25° C. before cure and the cured composition provides a thermal conductivity greater than about 1.5 W/mK.

40. A thermal interface material comprising:

(A) at least one polydiorganosiloxane having the general formula:

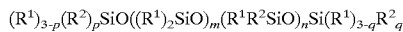

wherein $R^2$ is independently, at each occurrence, a vinylcyclohexeneoxy-functional group, a silane-functional group, an epoxy-functional group, a glycidoxy-functional group, an acryloxy-functional group, a polyimide-functional group, a polyurethane-functional group, vinyl or combinations thereof; $R^1$ is independently, at each occurrence, a $C_{1-8}$ alkyl radical, a phenyl radical, a vinyl radical or combinations thereof; "p" is 0 or 1; "q" is 0 or 1; "m"+"n" has a value sufficient to provide a polydiorganosiloxane with an initial viscosity in a range of between about 100 centipoise and about 50,000 centipoise at 25° C.;

(B) at least one reactive diluant present in a concentration at least about equal to the concentration of component (A);

(C) at least one cure catalyst; and (D) at least one thermally conductive filler present in a range of between about 60% by weight and about 95% by weight of the total silicone composition;

wherein the thermal interface material provides adhesion to at least one substrate and has a thermal conductivity greater than about 1.5 W/mK.

41. The thermal interface material in accordance with claim 40, wherein $R^2$ is an acryloxy-functional group.

42. The thermal interface material in accordance with claim 40, wherein $R^1$ is a methyl group.

43. The thermal interface material in accordance with claim 40, wherein the thermally conductive filler comprises silver, gold, copper, platinum, nickel, aluminum oxide, aluminum nitride, boron nitride, diamond, magnesium oxide, zinc oxide, zirconium oxide, or combinations thereof.

44. The thermal interface material in accordance with claim 43, wherein the thermally conductive filler comprises silver.

45. The thermal interface material in accordance with claim 40, wherein said at least one thermally conductive filler is present in a range of between about 70% by weight and about 95% by weight of the total silicone composition.

46. The thermal interface material in accordance with claim 40, wherein the reactive diluant comprises tert-butylstyrene, methacryloxypropyltrimethoxysilane, methylmethacrylate, hexanedioldiacrylate, glycidoxypropyltrimethoxysilane, vinyl ether, or combinations thereof.

47. The thermal interface material in accordance with claim 46, wherein the reactive diluant comprises methacryloxypropyltrimethoxysilane.

48. The method in accordance with claim 46, wherein the reactive diluant comprises vinyl ether.

49. The thermal interface material in accordance with claim 40, wherein the substrate comprises silicon.

50. The thermal interface material in accordance with claim 40, wherein the cure catalyst comprises peroxide, onium salt, platinum catalyst, or combinations thereof.

51. The thermal interface material in accordance with claim 50, wherein the cure catalyst comprises a bisaryliodonium salt.

52. The thermal interface material in accordance with claim 40, wherein the catalyst is present in a range of between about 10 parts per million and about 10% by weight of the total silicone composition.

53. The thermal interface material in accordance with claim 40, which further comprises at least one adhesion promoter.

54. The thermal interface material in accordance with claim 53, wherein the adhesion promoter comprises trialkoxyorganosilanes.

55. The thermal interface material in accordance with claim 54, wherein the trialkoxyorganosilane is γ-aminopropyltrimethoxysilane, glycidoxypropyltrimethoxysilane, bix(trimethoxysilylpropyl)fumarate, or combinations thereof.

56. The thermal interface material in accordance with claim 55, wherein the trialkoxyorganosilane is bis(trimethoxysilylpropyl)fumarate.

57. The thermal interface material in accordance with claim 53, wherein the adhesion promoter is present in a range between about 0.01% by weight and about 1% by weight of the total silicone composition.

58. A thermal interface material comprising:

(A) at least one polydiorganosiloxane having the general formula:

wherein $R^2$ is an acryloxy-functional group, $R^1$ is a methyl group, "p" is 0 or 1, "q" is 0 or 1, "m"+"n" has a value sufficient to provide a polydiorganosiloxane with an initial viscosity in a range of between about 100 centipoise and about 50,000 centipoise at 25° C.;

(B) at least one thermally conductive filler comprising silver present in a concentration in a range of between about 60% by weight and about 95% by weight, based on the total weight of the silicone composition;

(C) at least one reactive diluant comprising methacryloxypropyltrimethoxysilane present in a concentration at least about equal to the concentration of component (A);

(D) at least one cure catalyst wherein the cure catalyst comprises a bisaryliodonium salt; and (E) optionally, at least one adhesion promoter comprising bis(trimethoxysilylpropyl)fumarate wherein the thermal interface material has a viscosity in a range of between about 10,000 centipoise and about 250,000 centipoise before curing and a thermal conductivity greater than about 1.5 W/mK following curing.

* * * * *